US009110654B2

(12) United States Patent
Bromley, Jr. et al.

(10) Patent No.: US 9,110,654 B2
(45) Date of Patent: *Aug. 18, 2015

(54) DYNAMICALLY BUILDING LOCALE OBJECTS OR SUBSECTIONS OF LOCALE OBJECTS BASED ON HISTORICAL DATA

(71) Applicant: International Business Machines Corporation, Armonk, NY (US)

(72) Inventors: Leander Bromley, Jr., Catskill, NY (US); Christopher J. Brown, Rochester, MN (US); Thuy P. Christenson, Rochester, MN (US); Patrick L. Glenski, Rochester, MN (US); Kershaw S. Mehta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/761,093

(22) Filed: Feb. 6, 2013

(65) Prior Publication Data

US 2014/0089893 A1    Mar. 27, 2014

Related U.S. Application Data

(63) Continuation of application No. 13/627,419, filed on Sep. 26, 2012.

(51) Int. Cl.
  *G06F 9/44*    (2006.01)
  *G06F 9/445*   (2006.01)

(52) U.S. Cl.
  CPC .............. *G06F 8/30* (2013.01); *G06F 9/44521* (2013.01)

(58) Field of Classification Search
  None
  See application file for complete search history.

(56) References Cited

U.S. PATENT DOCUMENTS

| 5,835,768 | A | 11/1998 | Miller et al. |
| 6,023,584 | A | 2/2000 | Barton et al. |
| 6,025,836 | A | 2/2000 | McBride |
| 7,024,365 | B1 | 4/2006 | Koff et al. |
| 7,194,506 | B1 | 3/2007 | White et al. |
| 7,549,042 | B2 | 6/2009 | Glaum et al. |
| 7,698,126 | B2 | 4/2010 | Kohlmeier et al. |
| 7,913,235 | B2 | 3/2011 | Rose et al. |
| 2002/0078338 | A1 | 6/2002 | Lay et al. |
| 2002/0107684 | A1 | 8/2002 | Gao |

(Continued)

OTHER PUBLICATIONS

Just-in-time compilation, Wikipedia, Aug. 31, 2012.

*Primary Examiner* — Li B Zhen
*Assistant Examiner* — Amir Soltanzadeh
(74) *Attorney, Agent, or Firm* — Martin & Associates, LLC; Derek P. Martin

(57) ABSTRACT

During a first execution of software, historical data is logged that indicates which locale objects were used. During a second execution of the software, the historical data is read, and locale objects or subsections of locale objects are dynamically built from locale source files based on the historical data in the log that indicates which locale objects were used during the first execution. Any other locale objects or subsections that are needed that are not built initially during the second execution are dynamically built from locale source files when requested at run-time. Dynamically building locale objects or subsections based on which locale objects were used in one or more previous executions saves time that would otherwise be required to build the locale objects when they are needed at run-time. The result is significant savings in system-wide resources while still allowing for access to a large number of possible locales.

8 Claims, 14 Drawing Sheets

(56) References Cited

U.S. PATENT DOCUMENTS

| | | |
|---|---|---|
| 2003/0084401 A1 | 5/2003 | Abel et al. |
| 2004/0064807 A1* | 4/2004 | Rose et al. .................. 717/145 |
| 2004/0098486 A1* | 5/2004 | Gu et al. ..................... 709/228 |
| 2004/0158835 A1* | 8/2004 | Harvey et al. ................ 718/104 |
| 2005/0132179 A1 | 6/2005 | Glaum et al. |
| 2005/0137846 A1 | 6/2005 | Rose et al. |
| 2005/0138146 A1* | 6/2005 | Rose et al. .................. 709/219 |
| 2006/0206877 A1* | 9/2006 | Kohlmeier et al. ........... 717/137 |
| 2007/0061789 A1 | 3/2007 | Kaneko et al. |
| 2008/0154805 A1* | 6/2008 | Gurumoorthy et al. ........ 706/12 |
| 2011/0246974 A1 | 10/2011 | Kawachiya et al. |
| 2012/0022851 A1 | 1/2012 | Bremner et al. |
| 2012/0227056 A1 | 9/2012 | Ralston et al. |
| 2013/0144596 A1 | 6/2013 | Lui et al. |
| 2013/0191823 A1 | 7/2013 | Davidson et al. |

* cited by examiner

| Locale Object Historical Usage Log | |
|---|---|
| Locale Object A | |
| Locale Object D | |
| Locale Object H | |

| Locale Object Historical Usage Log | |
|---|---|
| Locale Object | Date Last Used |
| Locale Object A | 04/12/2012 |
| Locale Object D | 06/23/2012 |
| Locale Object H | 09/02/2012 |

DYNAMICALLY BUILDING LOCALE OBJECTS OR SUBSECTIONS OF LOCALE OBJECTS BASED ON HISTORICAL DATA

BACKGROUND

1. Technical Field

This disclosure generally relates to computer systems, and more specifically relates to locale objects that support software used in different languages and cultures.

2. Background Art

For computer software to be useful it must be capable of presenting information which reflects the users' cultural preferences, such as language and conventions, and allow users to interact with the software according to their preference. One way to account for different language and conventions is to customize software for a specific market, such as a geographical region or country. Such customized software is relatively inflexible in allowing users to alter the cultural or language preference of the software to meet particular needs. Therefore, in order to market software internationally, significant expense may be incurred in customizing the software for each individual international market and providing technical support and updates.

Great effort has been expended to make software "internationalized", which means the software may be easily and readily adapted to different languages and cultures. An internationalized application program has no built-in assumptions with respect to the cultural preference of its users or the data it is to process or present. Rather, it allows the user to specify the language or conventions of the information used to interact with the application and the language or conventions in which the information is presented by the application.

The establishment of ISO/IEC 9945-1:1990 (IEEE Standard 1003.2-1990) Information Technology-Portable Operating System Interface (POSIX™) Shell and Utilities provided a vehicle for the development of portable applications. IEEE Standard 1003.1 describes a set of basic system services for input/output, file system access, and process management to be used in the development of application programs. The standard also defines an interface accessible from the C programming language, which provides access to these services and establishes standard semantics and syntax. This interface allows application program developers to write portable applications in the C programming language.

In compliance with IEEE Standard 1003.1, IEEE Standard 1003.2 was developed to facilitate the internationalization of applications which did not require the application program developer to customize the application program for each cultural market. IEEE Standard 1003.2 defines a source code level interface to shell services and common utilities which is independent of IEEE Standard 1003.1. An extension of this standard is the User Portability Extension (UPE) (IEEE Standard 1003.2a) that addresses interactive terminal-oriented utilities such as full screen editors.

The IEEE Standards 1003.2 and 1003.2a are based on a "locale" model which provides the binding methodology for combining user preferences for language and conventions with the functions of the internationalized application program at run-time. The locale model describes the user's language or conventions to the application program and conveys it to the application program at run-time so that the data is processed and presented correctly according to the needs of the user. Locale objects are typically packaged with software to provide the needed support for different locales.

Some software includes a great number of different locale objects. For example, the C/C++ Run-Time Library for the z/OS operating system developed by IBM ships with over 2,000 different locale objects. Building and maintaining such a large number of locale objects requires significant cost and resources, especially when typical computing environments will only need a few locale objects.

BRIEF SUMMARY

During a first execution of software, historical data is logged that indicates which locale objects were used. During a second execution of the software, the historical data is read, and locale objects or subsections of locale objects are dynamically built from locale source files based on the historical data in the log that indicates which locale objects were used during the first execution. Any other locale objects or subsections that are needed that are not built initially during the second execution are dynamically built from locale source files when requested at run-time. Dynamically building locale objects or subsections based on which locale objects were used in one or more previous executions saves time that would otherwise be required to build the locale objects when they are needed at run-time. The result is significant savings in system-wide resources while still allowing for access to a large number of possible locales.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 2:
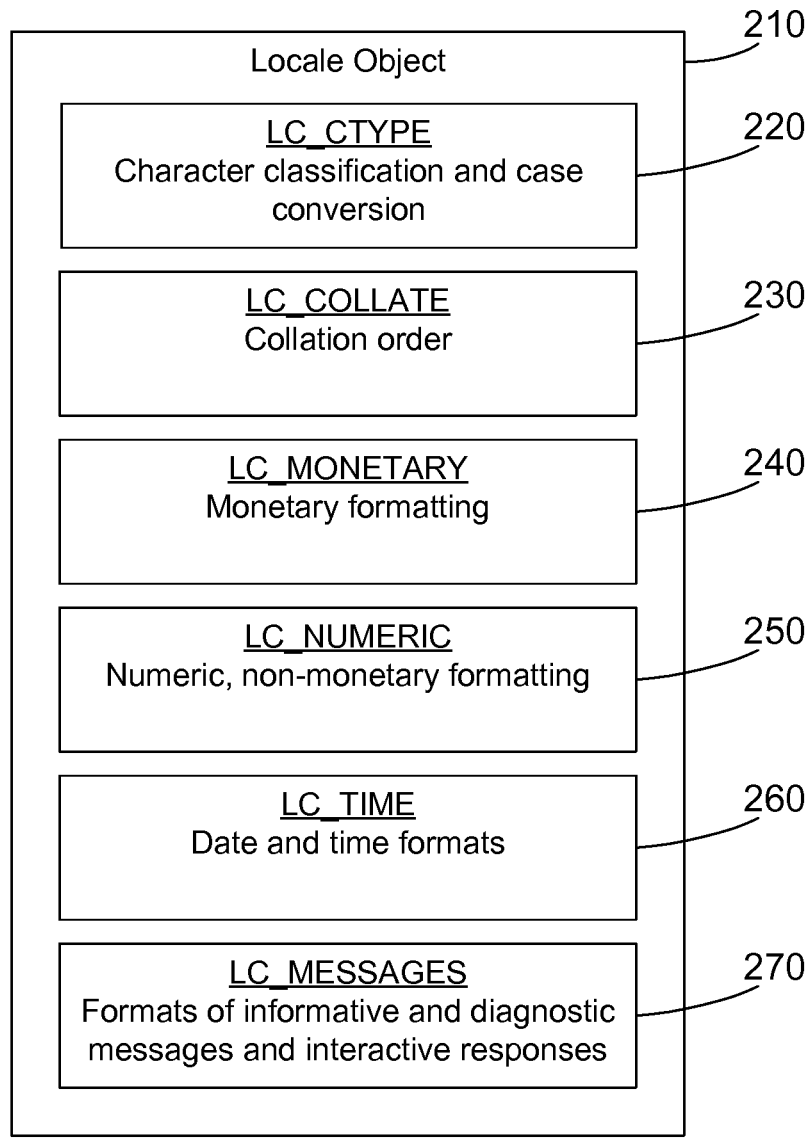
FIG. 2 is a block diagram of an example prior art locale object.

As described in the Background Art section above, a "locale" model provides the methodology for combining user preferences for language and conventions with the functions of an internationalized application program at run-time. The locale model defines six categories of cultural variables, which are collectively referred to as "locale categories": (1) character attributes and mappings; (2) character collation; (3) monetary formatting; (4) numeric data formatting; (5) date and time formatting; and (6) messages. Values are specified for each of the locale categories which particularizes the type of formatting to be applied to the data to be processed or presented. For example, possible values for the locale category "monetary formatting" would be United States (dollar), Japan (yen), etc. which would result in the monetary data being formatted to be processed or presented according to the currency of the specified country. When the six locale categories are assigned specific values, they are collectively referred to as a "locale". The locale categories are referenced by the application program as the application program is executed. One known locale object 210 shown in FIG. 2 is suitable for use with programs written in the C/C++ programming language. Locale object 210 includes a category LC_CTYPE 220 that provides information relating to character classification and case conversion. A category LC_COLLATE 230 provides information relating to collation order. A category LC_MONETARY 240 provides information relating to monetary formatting. A category LC_NUMERIC 250 provides information relating to numeric, non-monetary formatting. A category LC_TIME 260 provides information relating to date and time formats. A category LC_MESSAGES 270 provides information relating to formats of informative and diagnostic messages and interactive responses. Once the locale object 210 is loaded into the memory of a software application that needs information in the locale object 210, the software application may invoke any of the categories in the locale object as needed. Because the prior art locale object 210 is well-known in the art, additions details of the prior art locale object 210 are not included here. One specific example for prior art locale object 210 is a Portable Operating System Interface (POSIX) locale object.

Figure 3:
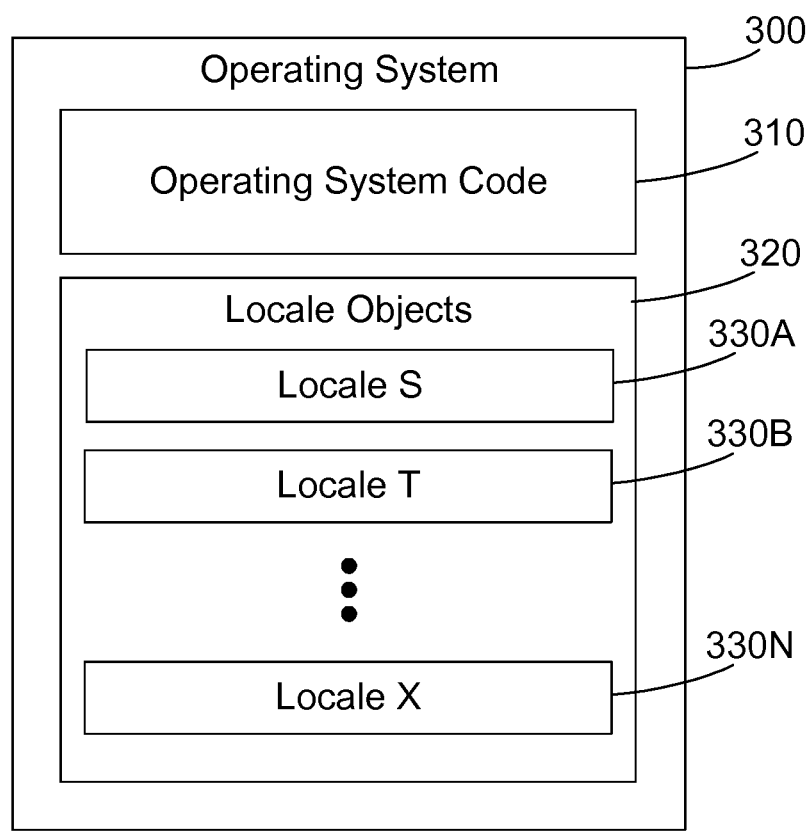
FIG. 3 is a block diagram of a prior art operating system showing locale objects packaged with operating system code.

Referring to FIG. 3, a prior art operating system 300 is shown, which includes operating system code 310 and locale objects 320. The operating system code 310 may include any suitable operating system code or function. Other features of operating system 300 not specifically shown in FIG. 3 are presumed to be present in the operating system code 310. The representation in FIG. 3 simply shows an operating system 300 shipped to a customer for installation on a computer system typically includes multiple locale objects 320. Individual locale objects 330 are shown in FIG. 3 as locale S 330A, locale T 330B, . . . , locale X 330N.

Figure 4:
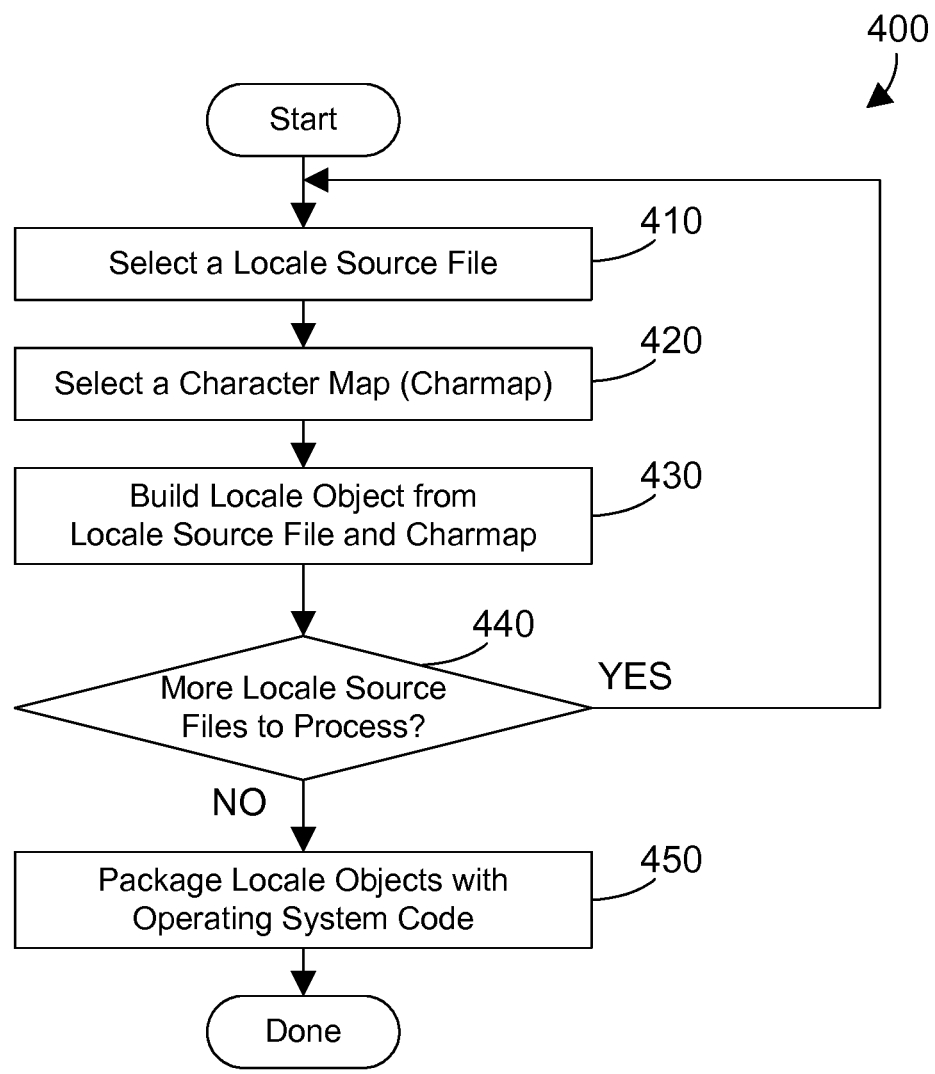
FIG. 4 is a flow diagram of a prior art method for building locale objects and packaging the locale objects with the operating system code.

FIG. 4 shows a prior art method 400 for building locale objects and packaging locale objects with operating system code. A locale source file is selected (step 410). A locale source file as known in the art is a file that includes text for each of the six locale categories shown in FIG. 2, which uniquely define a set of cultural and linguistic standards or preferences. A locale source file must be processed by a locale object builder to build a locale object. Returning to FIG. 4, a character map is selected (step 420). A locale object is then built from the selected locale source file and the selected character map (step 430). When there are more locale source files to process (step 440=YES), method 400 loops back to step 410 and continues. When there are no more locale source files to process (step 440=NO), all of the locale objects created in steps 410-440 are packaged with the operating system code (step 450), with the result as shown in FIG. 3.

Figure 5:
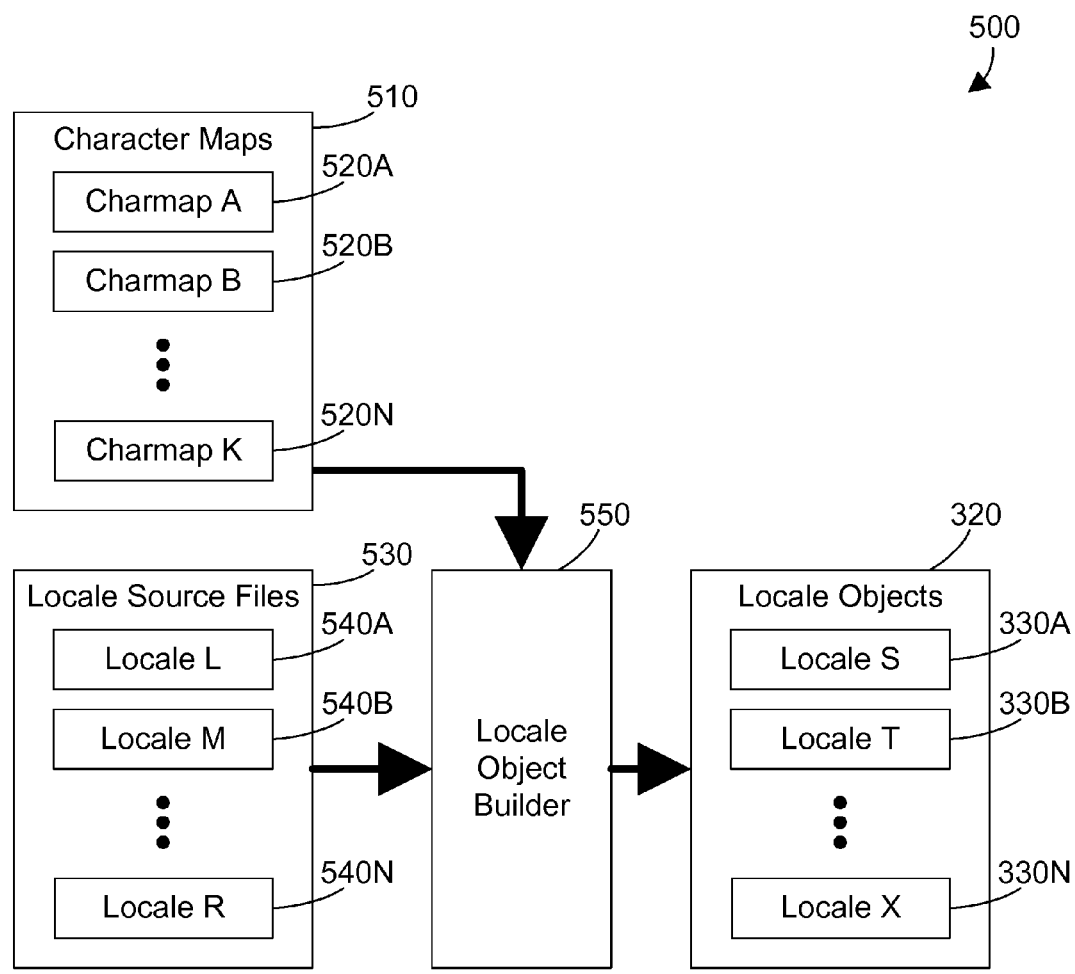
FIG. 5 is a block diagram of a prior art system showing building of locale objects for packaging with operating system code during the manufacturing of the operating system.

FIG. 5 shows a system 500 for performing method 400 in FIG. 4. A locale object builder 550 builds locale objects 320, shown in FIG. 5 as locale S 330A, locale T 330B, . . . , locale X 330N from character maps 510 and locale source files 530. Thus, locale object 330 could be built by the locale object builder 550 from charmap A 520A and locale source file M 540B. Locale object 330B could be built from charmap K 520N and locale source file L 540A. Because the locale objects 320 are packaged with the operating system code as shown in FIG. 3, the locale object builder 550 is run at the factory where the operating system is manufactured. Thus, prior art system 500 is part of the operating system manufacturing process, and is not performed at run-time of the operating system.

Figure 6:
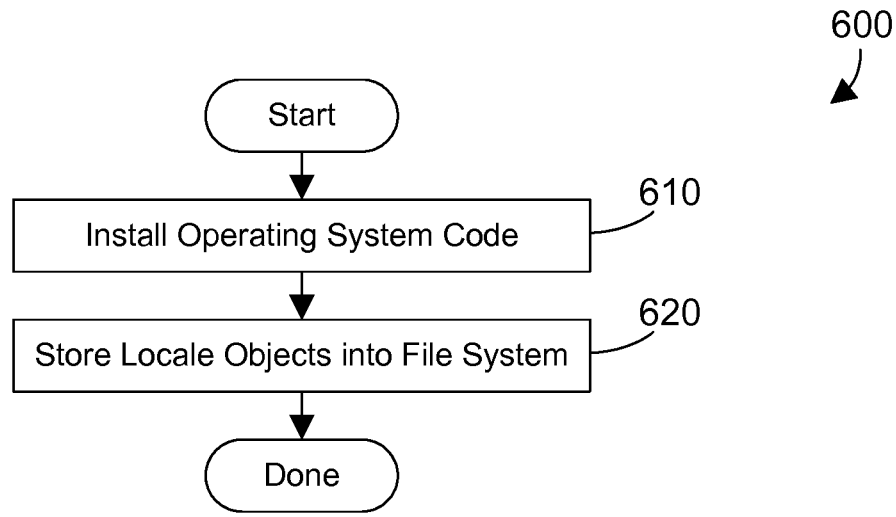
FIG. 6 is a flow diagram of prior art method for installing the prior art operating system shown in FIG. 3.

Prior art method 600 in FIG. 6 is a method that shows what happens when the operating system 300 shown in FIG. 3 is initially installed on a computer system. First, the operating system code is installed (step 610). All of the locale objects packaged with the operating system are then stored into the file system of the operating system (step 620). Method 600 is then done. Many operating systems and applications may include a large number of locale objects, hundreds or even thousands. As stated above in the Background Art section, C/C++ Run-Time Library for the z/OS operating system developed by IBM ships with over 2,000 different locale objects. Practical experience shows that most operating system installations will need fewer than ten locales, with some needing only a few. Yet all of the locales packaged with the operating system, even hundreds or thousands of locales, are stored into the file system of the operating system in step 620. Storing thousands of locales in the file system when only a few are needed results in a substantial waste of system resources in the file system.

Figure 7:
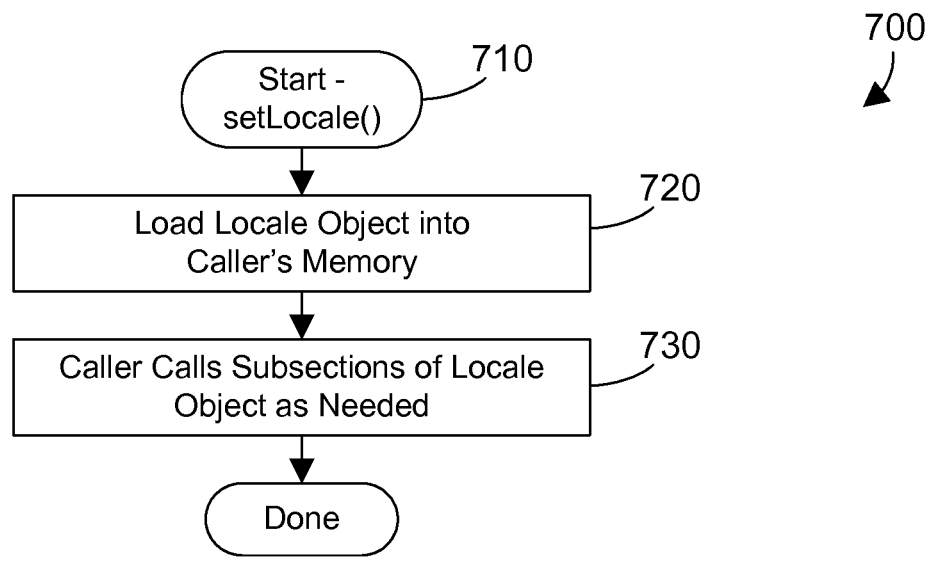
FIG. 7 is a flow diagram of a prior art method for loading a locale object into the memory of a calling computer program and accessing subsections of the locale object as needed.

As shown in FIG. 7, once the operating system is loaded and running, a locale for the operating system may be set by invoking the setLocale( ) function (step 710). The setLocale( ) function is typically invoked by an application that needs locale information. The requested locale object is loaded into the memory of the application that invoked the setLocale( ) function (the "caller's memory") (step 720), and the calling application calls the subsections of the locale object as needed (step 730). Method 700 is then done. Because the locale object is loaded into the memory of the calling application in step 720, when ten different applications are running that all need to access the same locale object, the result will be the replication of the locale object ten times in the memory of each calling application. Note the terminology herein for step 730 is that an application "calls" subsections of the locale object, which is consistent with how locale objects are discussed in the prior art. However, locale objects are text-like files that provide locale information, and normally there is no executable code in a locale object. For this reason, when an application calls, invokes or references a subsection of a locale object, the application is simply reading text information from the subsection of the locale object, and is not calling executable code.

Pre-building hundreds or thousands of locale objects and packaging those hundreds or thousands of locale objects with an operating system or application requires substantial effort and resources to both generate and maintain the operating system or application. This is further exacerbated by the fact that one locale source file may be used to build multiple locale objects. For example, one locale source file could be used with an American Standard Code for Information Interchange (ASCII) character map to build a first locale object. The same locale source file could be used with an Extended Binary Coded Decimal Interchange Code (EBCDIC) character map to build a second locale object. The same locale source file could be used with a Unicode character map to build a third locale object. This simple example illustrates how a computer program can have hundreds or thousands of locale objects that are built from a much smaller set of locale source files.

The claims and disclosure herein provide a way to log historical data that indicates which locale objects were used during a first execution of software. During a second execution of the software, the historical data is read, and locale objects or subsections of locale objects are dynamically built from locale source files based on the historical data in the log that indicates which locale objects were used during the first execution. Any other locale objects or subsections that are needed that are not built initially during the second execution are dynamically built from locale source files when requested at run-time. Dynamically building locale objects or subsections based on which locale objects were used in one or more previous executions saves time that would otherwise be required to build the locale objects when they are needed at run-time. The result is significant savings in system-wide resources while still allowing for access to a large number of possible locales.

Figure 1:
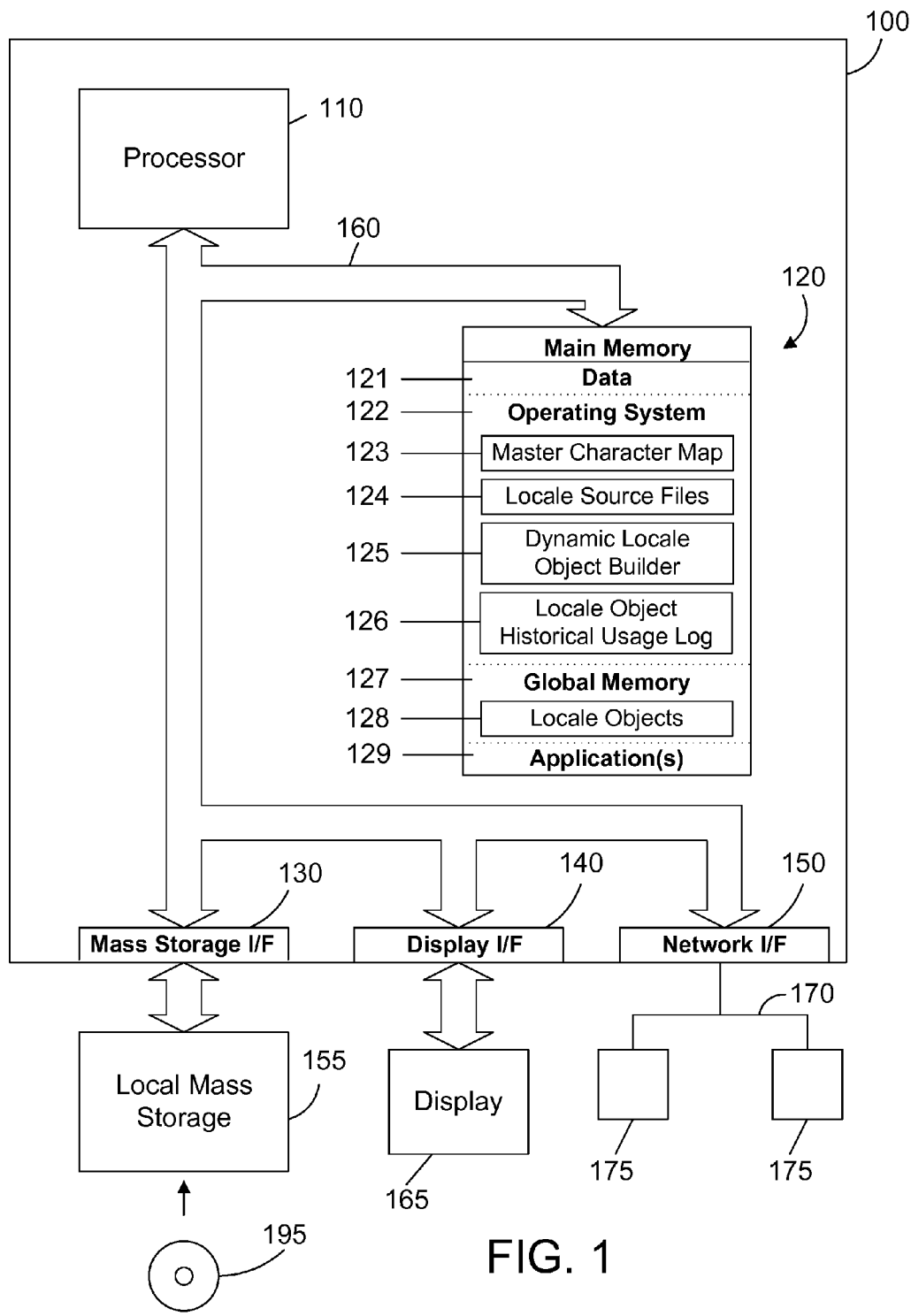
FIG. 1 is a block diagram of an apparatus that includes a dynamic locale object builder.

Referring to FIG. 1, a computer system 100 is one suitable implementation of a server computer system that includes a dynamic locale object builder. Server computer system 100 is an IBM zEnterprise System computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, global memory 127, and one or more applications 129. Data 121 represents any data that serves as input to or output from any program in computer system 100. Operating system 122 is a multitasking operating system. Operating system 122 includes a master character map 123, locale source files 124, a dynamic locale object builder 125, and a locale object historical usage log 126. One suitable implementation of the master character map 123 is a master character map based on Unicode because Unicode is a superset of all other encodings. This allows other character maps to be dynamically generated from the master character map 123 as needed. The dynamic locale object builder 125 receives requests from applications 129 at run-time, and in response, identifies a needed character map and one of the locale source files, generates the needed character map from the master character map 123, then dynamically builds at least one of the locale objects 128 from the generated character map and locale source file. The locale objects 128 are stored in global memory 127, which means memory that can be read by multiple applications. The locale objects 128 have a structure defined by the locale source file used to build each locale object. In one specific implementation, the locale source files 124 and the locale objects 128 have the same categories shown in the prior art locale object 210 shown in FIG. 2. The locale object historical log 126 includes historical data relating to which locale objects were used in one or more previous executions of software, such as operating system 122. By logging which locale objects are used during a first execution of the software, these locale objects may be dynamically created during the second execution of the software based on the historical data, as discussed below in detail with reference to FIG. 15.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, global memory 127, and applications 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the dynamic locale object builder 125 in operating system 122.

Although computer system 100 is shown to contain only a single processor and a single system bus, those skilled in the art will appreciate that a dynamic locale object builder may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/ or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
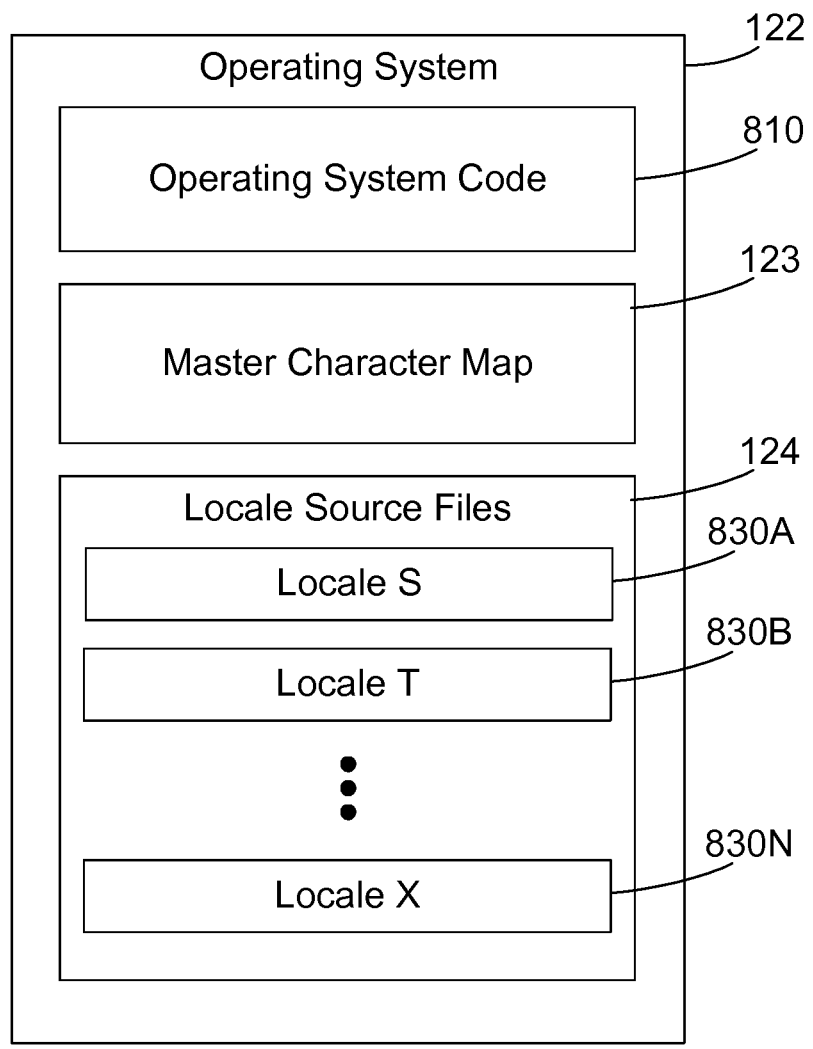
FIG. 8 is a block diagram of an operating system packaged with a master character map and locale source files.
Figure 9:
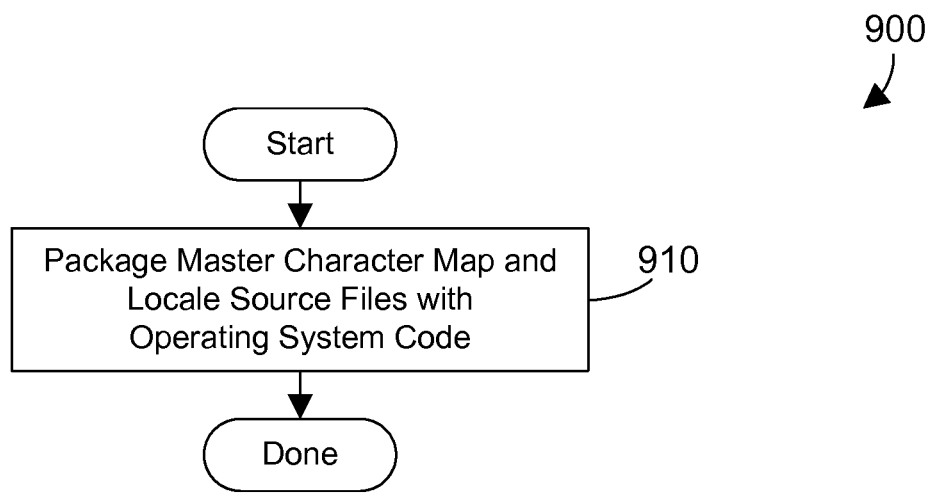
FIG. 9 is a flow diagram of a method for packaging the master character map and locale source files with operating system code as shown in FIG. 8.

Referring to FIG. 8, the operating system 122 includes operating system code 810 packaged with the master character map 123 and locale source files 124. The operating system code 810 could be the same as prior art operating system code 310 shown in FIG. 3, or could be different code. The master character map 123 is preferably a single character map from which all other needed character maps may be generated. The locale source files 124 could be the same as the locale source files 530 shown in FIG. 5, or could be different than the prior art locale source files 530. Locale source files 124 include multiple individual locale source files 830, shown in FIG. 8 as 830A, 830B, . . . , 830N. The locale source files 124 can have any suitable configuration, including the categories in prior art locale object 200 shown in FIG. 2. FIG. 9 shows a method 900 that packages the master character map and locale source files with the operating system code (step 910). By packaging the master character map 123 and locale source files 124 with the operating system code 810 as shown in FIG. 8, locale objects may be dynamically built at run-time as described in detail below.

Figure 10:
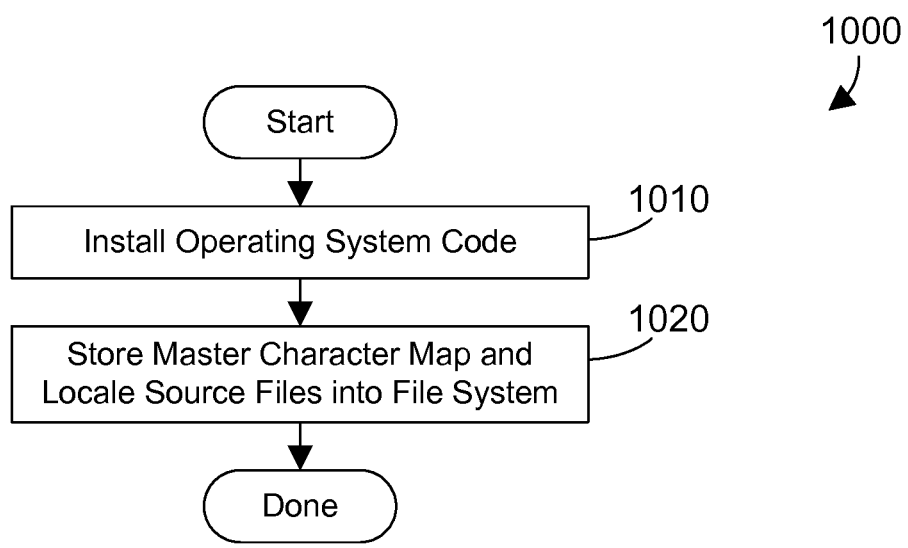
FIG. 10 is a flow diagram of a method for installing the operating system shown in FIG. 8.

A method 1000 in FIG. 10 is performed when the operating system is initially installed on a computer system. The operating system code is installed (step 1010). The master character map and locale source files that were packaged with the operating system are then stored into the file system (step 1020). Method 1000 is then done. Because the number of locale source files is significantly less than the number of locale objects, and because the only character map packaged with the operating system is the master character map 123, the result is a reduction in the size of the operating system 122 when compared to prior art operating system 300 shown in FIG. 3. This makes the operating system 122 easier to create and maintain.

Figure 11:
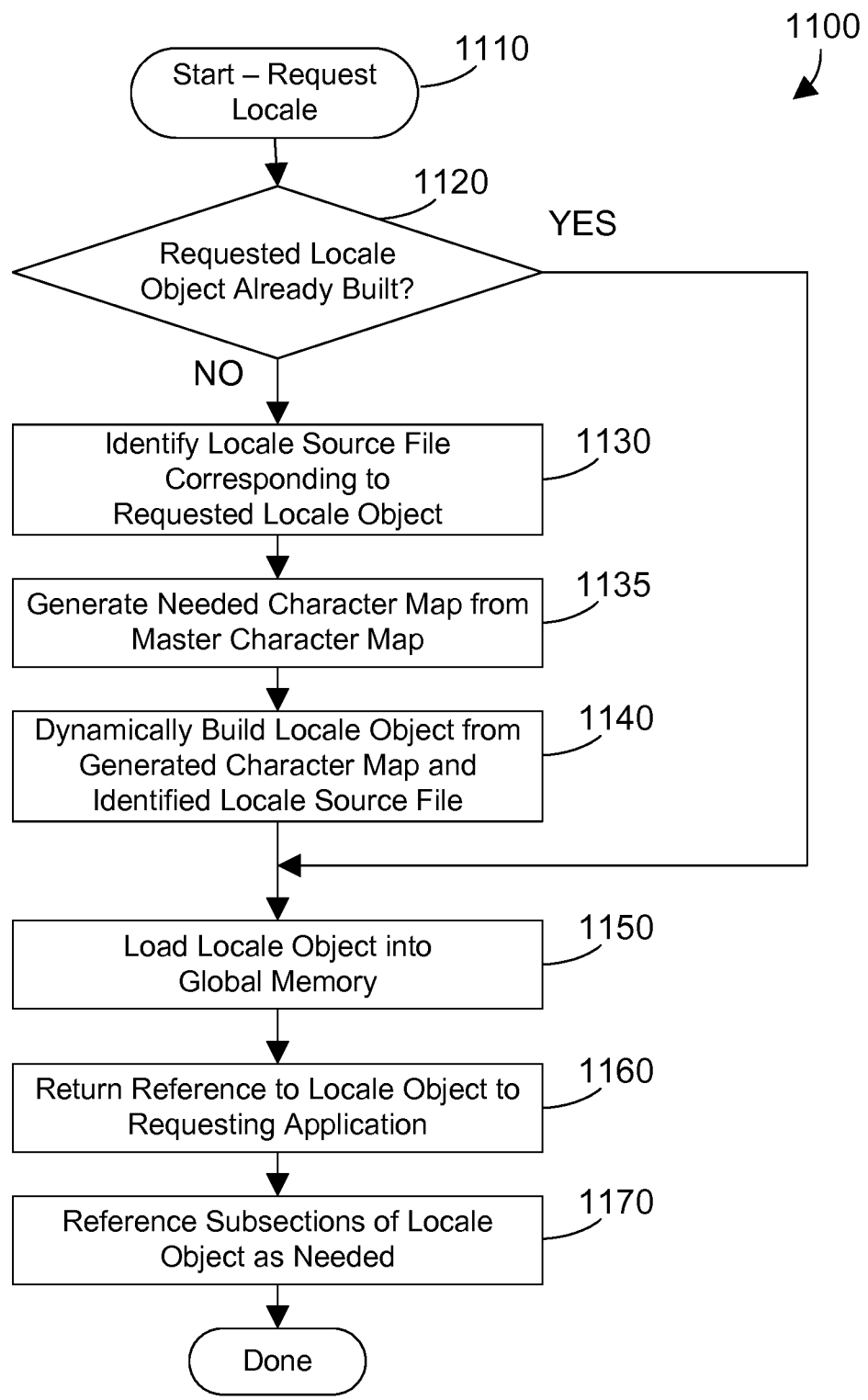
FIG. 11 is a flow diagram of a method for dynamically building a locale object when requested.

Referring to FIG. 11, a method 1100 is performed when an application program requests a locale (step 1110) to gain access to locale information. Note the request can take the form of a request for the entire locale object, or a request for a subsection of the locale object. If the requested locale is not already built (step 1120=NO), the locale source file corresponding to the requested locale object is identified (step 1130). The needed character map is dynamically generated from the master character map (step 1135). The requested locale object is then dynamically built from the generated character map and the identified locale source file (step 1140). The locale object is then loaded into global memory (step 1150). As discussed above, the term "global memory" as used herein means memory that can be read by multiple application programs. By loading the requested locale object into global memory, the requested locale object may be read by all applications that need access to it, thereby reducing the memory space needed to store locale objects. A reference to the locale object is then returned to the requesting application (step 1160), which references subsections of the locale object as needed (step 1170). Method 1100 is then done.

Figure 12:
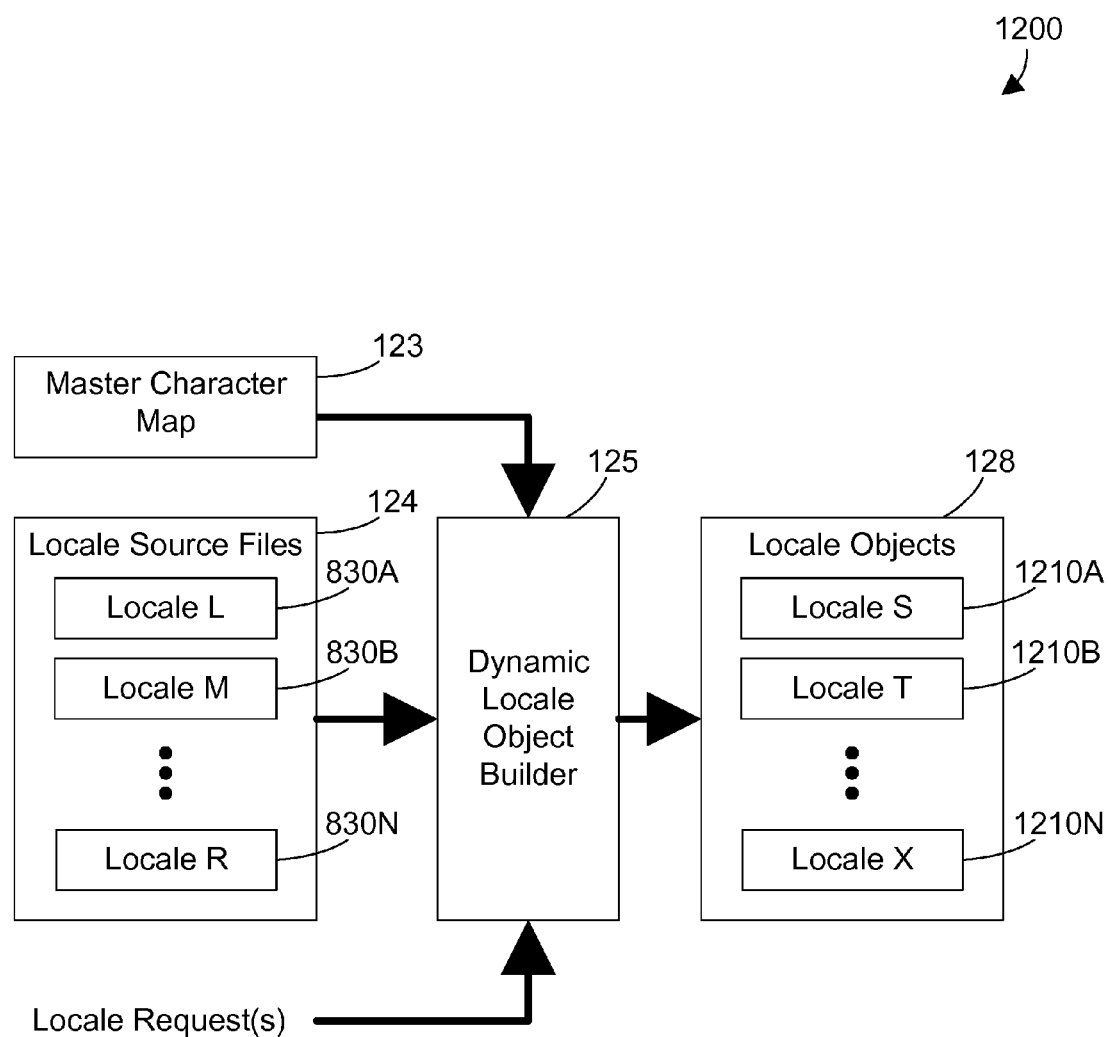
FIG. 12 is a block diagram of a system for dynamically building locale objects at run-time.

Referring to FIG. 12, a system 1200 illustrates the building of locale objects at run-time. The dynamic locale object builder 125 functions in accordance with locale requests received from applications. When a locale request is received by the dynamic locale object builder 125, the appropriate character map is generated from the master character map 123, the appropriate locale source file is identified, and the character map and local source file are used to dynamically build a corresponding locale object 128. Individual locale objects are shown in FIG. 12 as locale S 1210A, locale T 1210B, . . . , locale X 1210N. Note that system 1200 in FIG. 12 is similar in some respects to prior art system 500 shown in FIG. 5. However, the differences are significant. Prior art system 500 in FIG. 5 builds locale objects at the location where the operating system is being manufactured, not where the operating system runs at the customer site. System 1200 in FIG. 12 dynamically builds locale objects as needed at run-time. Prior art system 500 builds locale objects upon command by a human operator. System 1200 builds locale objects when they are requested at run-time by an application. Prior art system 500 builds locale objects from a human operator selecting a character map and a locale source file. System 1200 builds local objects dynamically from a character map dynamically generated from a master character map, and from a locale source file specified in a call from an application. By dynamically building locale objects as needed at run-time, the number of locale objects shipped with the operating system is vastly reduced, while still providing the flexibility to use any locale object when needed.

Figure 13:
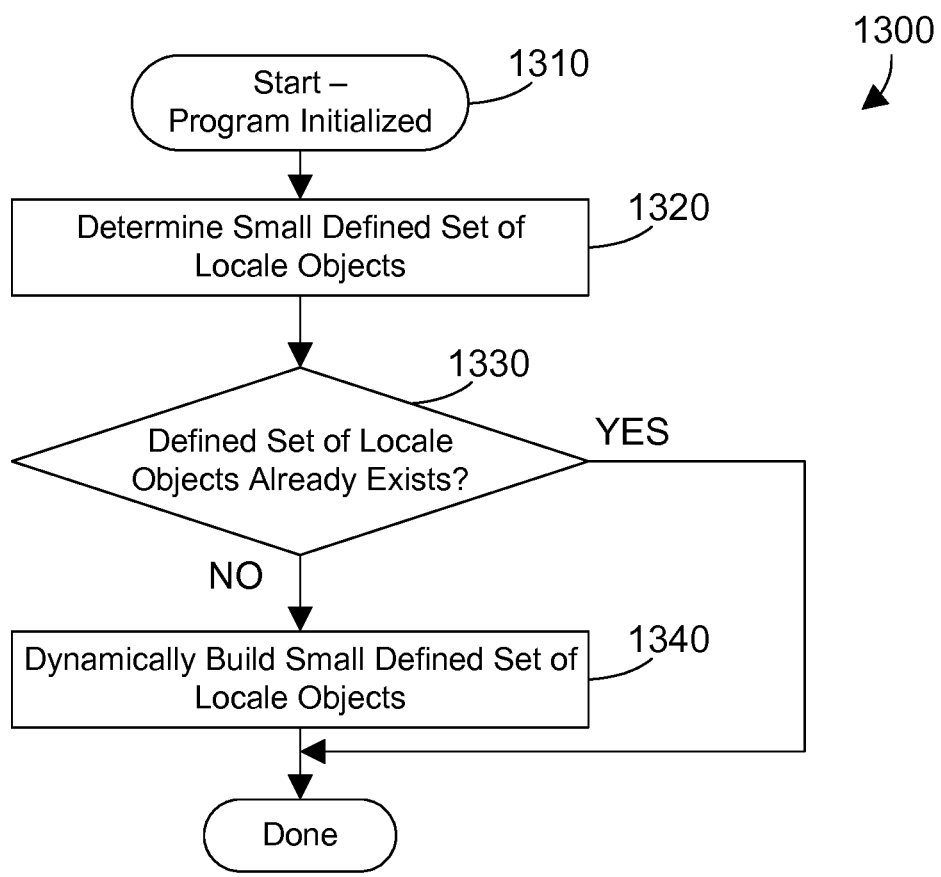
FIG. 13 is a flow diagram of a method for pre-loading a small defined set of locale objects on system boot.

In one particular implementation using the example of an operating system, at initial program load (system boot), the operating system has no locale objects and must build the needed locale objects. One way to accomplish this is shown in method 1100 in FIG. 11, building one locale object at a time as requested by an application. In an alternative implementation, the operating system could build a small defined set of locale objects when the operating system starts up, thereby eliminating the need to dynamically build the locale objects in the small defined set when requested by an application. Such an implementation is shown in method 1300 in FIG. 13. Method 1300 begins at program initialization (step 1310). One suitable example for program initialization is when an operating system starts after system boot. A small defined set of locale objects is determined (step 1320). The defined set of objects could be stored, for example, in a database table or other data structure. If all of the locale objects in the small defined set already exist (step 1330=YES), method 1300 is done. The locale objects in the small defined set may already exist, for example, when the locale objects are persisted. When the locale objects in the small defined set do not already exist (step 1330=NO), the small defined set of locale objects is dynamically built (step 1340). Method 1300 is then done. Note that method 1300 in FIG. 13 could be used in conjunction with method 1100 in FIG. 11. A simple example will illustrate. Let's assume locale objects are not persisted in a computer system that is initialized. With this assumption, the system initializes in step 1310, the small defined set of locale objects are determined in step 1320, and because these locale objects do not already exist (because they are not persisted) (step 1330=NO), they are dynamically built (step 1340). Method 1100 could then be performed to dynamically build any other needed locale objects when requested by an application. Method 1300 thus adds flexibility in allowing locale objects to be built when an operating system starts up.

Figure 14:
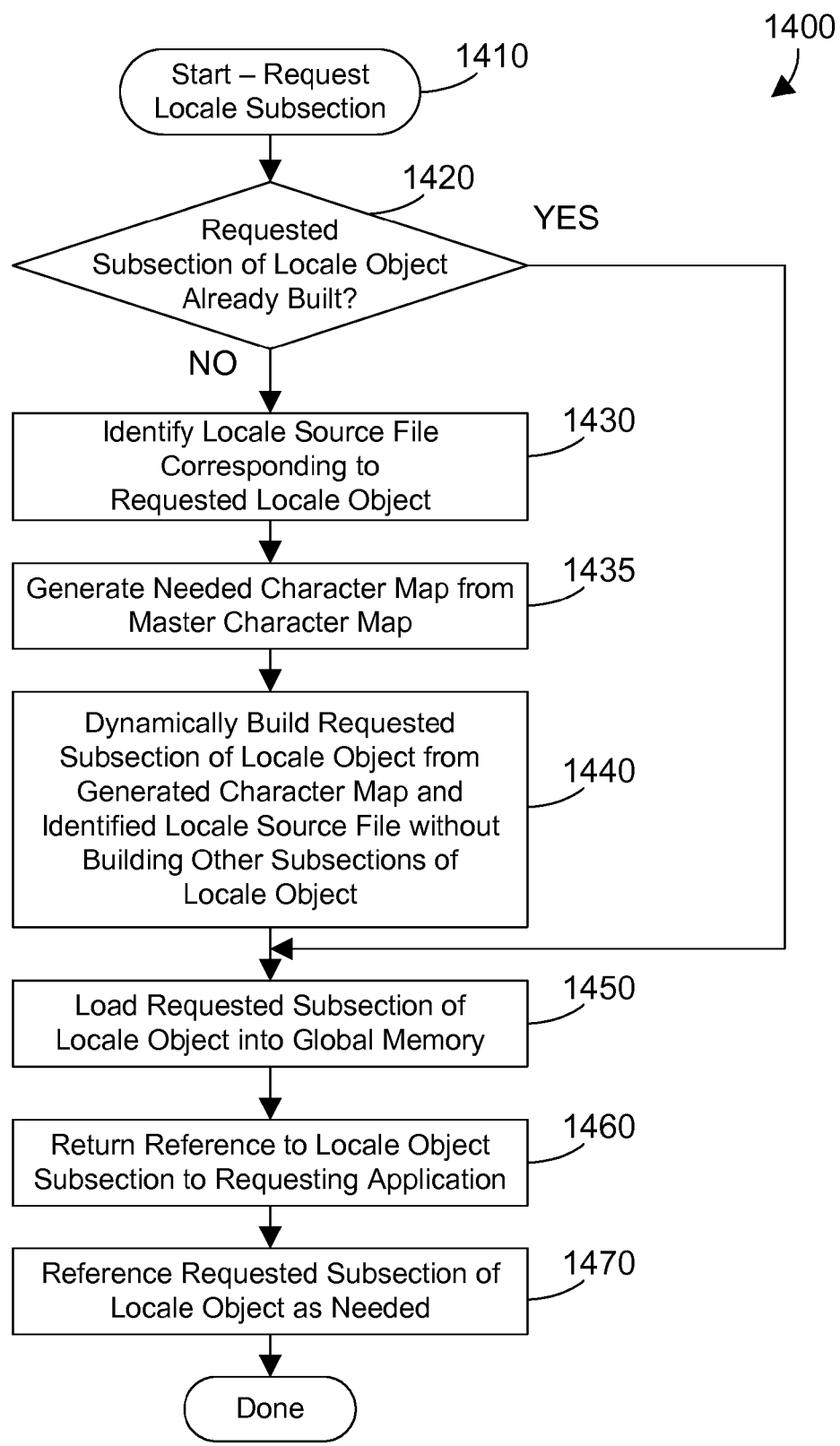
FIG. 14 is a flow diagram of a method for dynamically building a requested subsection of a locale object when requested without building all subsections of the locale object.

FIG. 11 shows one particular method 1100 of operation for the dynamic locale object builder 125 shown in FIG. 1. Method 1100 in FIG. 11 dynamically builds an entire locale object, including all of its subsections, when any subsection of the locale object is requested. FIG. 14 shows an alternative method 1400 of operation for the dynamic locale object builder 125 that builds only a requested subsection of a locale object without building other subsections of the locale object. Method 1400 begins with an application requests a locale subsection (step 1410). When the requested subsection has already been built (step 1420), the requested subsection is loaded into global memory (step 1450), and a reference to the locale object subsection is returned to the requesting application (step 1460). The requesting application then references the requested subsection as needed (step 1470). When the requested subsection of the locale object has not been built (step 1420=NO), the locale source file corresponding to the requested subsection is identified (step 1430), the needed character map is generated from the master character map (step 1435), and the requested subsection of the locale object is dynamically built from the generated character map and locale source file without building other subsections of the locale object (step 1440). In other words, only the requested subsection of the locale object is built in step 1440. Contrast this to step 1140 in FIG. 11, where the entire locale object is dynamically created, including all of its subsections. The requested subsection of the locale object is then loaded into global memory (step 1450), a reference to the locale object subsection is returned to the requesting application (step 1460), and the requested subsection is referenced by the requesting application as needed (step 1470). Method 1400 is then done. Building only the requested subsection of the locale object instead of building the entire locale object, including all its subsections, saves on processing time and system storage used, thereby enhancing system performance.

Figure 15:
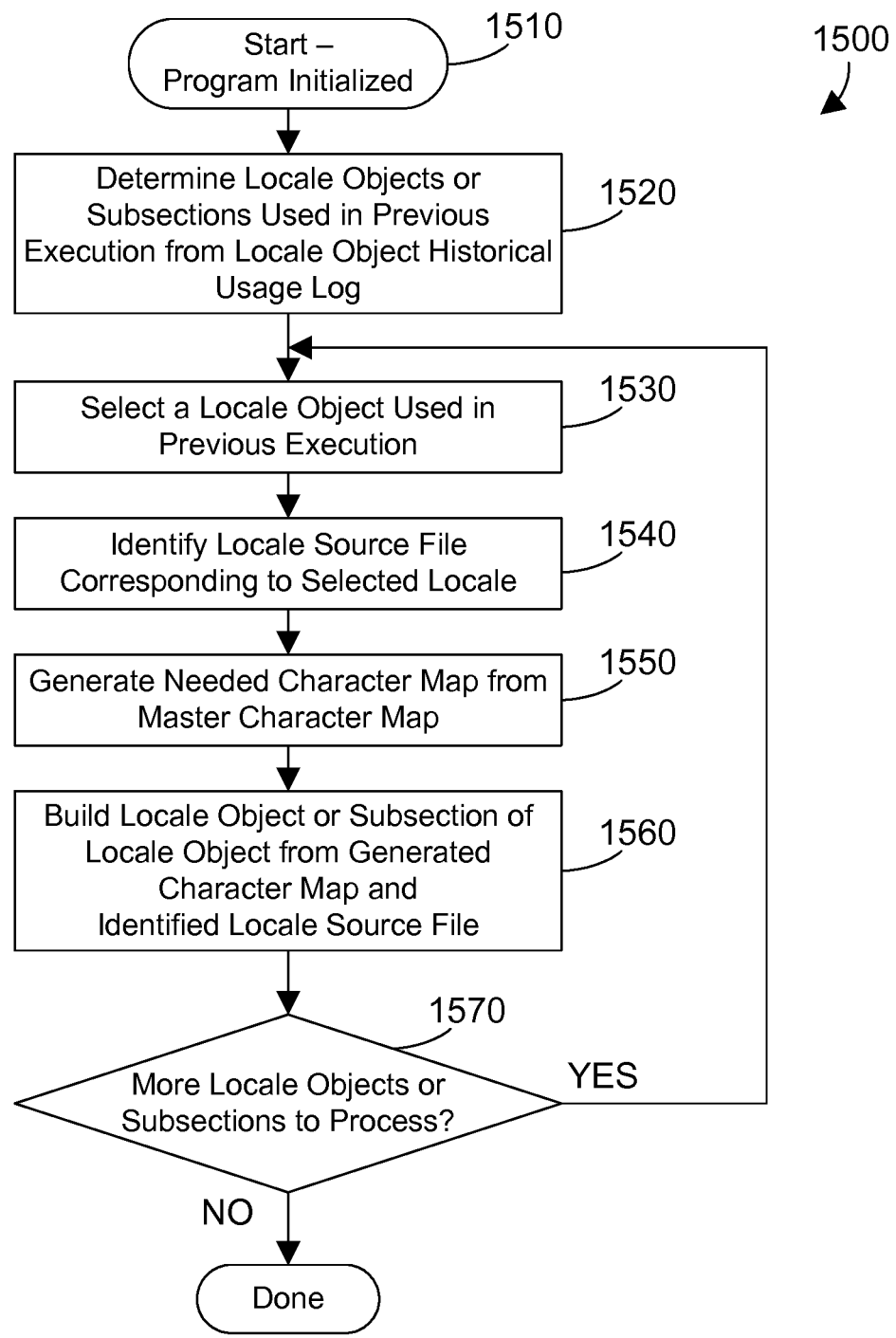
FIG. 15 is a flow diagram of a method for dynamically building one or more locale objects during a second execution of software based on historical data that indicates which locale objects were used in one or more previous executions of the software.

Dynamically building locale objects or subsections of locale objects when requested as shown in FIGS. 11 and 14 requires building these locale objects or subsections the first time they are referenced each time the software is initialized. The performance of the computer system may be increased by pre-building locale objects at program initialization based on historical data that indicates which locale objects were used during one or more previous executions of the software. Referring to FIG. 15, method 1500 begins at program initialization (step 1510). The locale objects or subsections used in one or more previous executions are then determined from the locale object historical usage log 126 shown in FIG. 1 (step 1520). One of the locales in the log is selected (step 1530). The corresponding locale source file is identified (step 1540), and the needed character map is generated from the master character map (step 1550). The locale object or subsection is then built from the generated character map and the identified locale source file (step 1560). When there are more locale objects or subsections in the locale object historical usage log 126 to process (step 1570=YES), method 1500 loops back to step 1530 and continues. When there are no more locale objects to process (step 1570=NO), method 1500 is done. Method 1500 thus shows a way to pre-build locale objects at program initialization based on historical data that indicates which locale objects were used in one or more previous executions of the software. Note the term "previous execution" can mean a variety of different things depending on the context. For example, in the case of a stand-alone computer system, a previous execution of an operating system could refer to the last time the computer system was booted up (or initialized). In the case of a logically-partitioned computer system, a previous execution of an operating system could refer to the last time a logical partition was initialized. In the case of an application, a previous execution could refer to the last time the application was run, regardless of whether the operating system or computer system was re-initialized or not.

Figures 16, 17, 18:
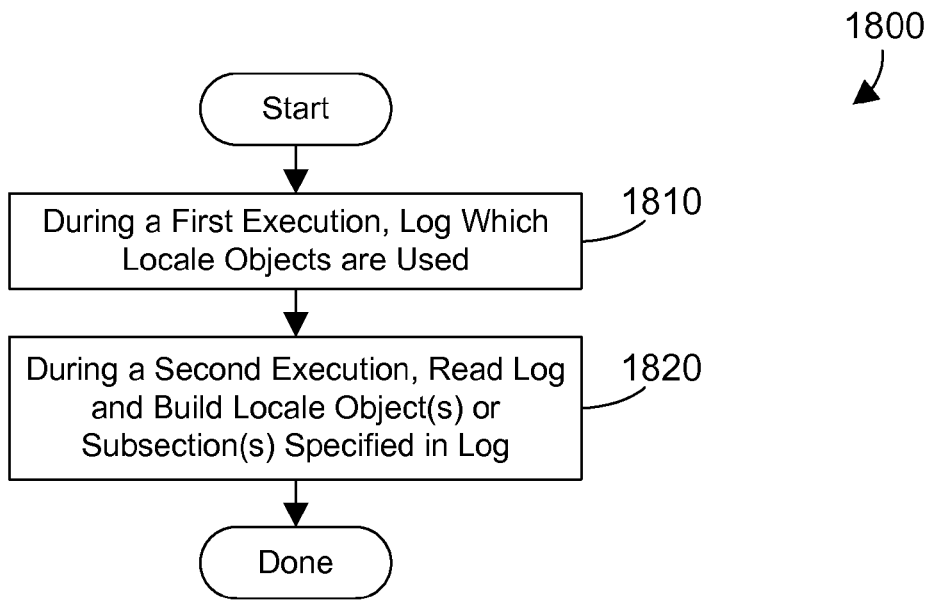
FIG. 16 is a block diagram showing a first suitable implementation for the locale object historical usage log shown in FIG. 1.
FIG. 17 is block diagram showing a second suitable implementation for the locale object historical usage log shown in FIG. 1.
FIG. 18 is a flow diagram of a method for building locale objects or subsections based on historical data logged during a previous execution.

Referring to FIG. 16, a sample locale object historical usage log 1600 is a first suitable implementation for the locale object historical usage log 126 shown in FIG. 1. The locale object historical usage log 1600 includes multiple entries 1610, 1620 and 1630, with each entry specifying a locale object that was used during one or more previous executions. In the implementation shown in FIG. 16, each locale object used is added to the log 1600 as the locale object is used. In other words, the log 1600 will reflect all locale objects ever used during any execution. Thus, log 1600 shown in FIG. 16 could result from a first execution that used locale object A, resulting in creating an entry 1610 in the log 1600. During the second execution, the locale object A would be pre-built as shown in FIG. 15, and a second locale object could use locale object D, resulting in creating entry 1620 in the log 1600. During the third execution, the locale objects A and D would be pre-built as shown in FIG. 15, and a third locale object could use locale object H, resulting in creating entry 1630 in log 1600. Log 1600 thus becomes cumulative, indicating all locale objects that have ever been used during previous executions. Of course, the operating system or application that uses locale objects could include a utility to reset or clear the locale object historical usage log, or to delete any specified entry. Clearing the locale object historical usage log might be useful, for example, when a computer system that has been running in one environment is moved to a new and different environment.

FIG. 17 shows a sample locale object historical usage log 1700 that is a second suitable implementation for the locale object historical usage log 126 shown in FIG. 1. Log 1700 includes multiple entries 1710, 1720 and 1730, with each entry specifying a locale object and the date the locale object was last used. By specifying a data the locale object was last used, the operating system or application could automatically delete entries from the log 1700 that are older than some defined threshold. For example, let's assume a computer system is booted on Sep. 5, 2012, and a threshold of 90 days is set for the locale object historical usage log 1700. Because locale objects D and H, shown in entries 1720 and 1730, respectively, have last used dates less than 90 days from the current date, locale objects D and H would be pre-built at system boot (program initialization) as shown in FIG. 15. Because locale object A 1710 was last used more than 90 days ago, the entry 1710 could be ignored during the pre-building of locale objects in FIG. 15, or could be deleted from the log 1700.

Another suitable implementation for a locale object historical usage log 126 would be to keep information about the last N locale objects used, where N is a predefined number. Thus, if N is selected to be 5, historical usage log 126 will contain entries relating to the last 5 locale objects used.

While the sample locale object historical usage logs 1600 and 1700 shown in FIGS. 16 and 17, respectively, specify locale objects, the locale object historical usage log 126 may specify either locale objects, as shown in FIGS. 16 and 17, or may also specify subsections of locale objects as well. The disclosure and claims herein expressly extend to building at program initialization any locale objects or subsections of locale objects specified in the historical usage log.

Referring to FIG. 18, a method 1800 is preferably performed by the operating system 122 shown in FIG. 1. During a first execution, the locale object historical usage log is used to log which locale objects are used (step 1810). Then, during a second execution that is subsequent to the first execution, the log is read, and the locale objects or subsections specified in the log are built (step 1820). Method 1800 thus builds locale objects when software is initialized based on the locales used in one or more previous executions of the software.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While a POSIX locale object is shown in FIG. 2, the disclosure and claims herein expressly extend to any type of locale source file and locale object, whether currently known or developed in the future. In addition, while the examples in this disclosure (such as shown in FIG. 8) show an operating system packaged with a master character map and locale source files, this is by way of example. Any suitable computer program could be packaged with character maps and locale source files so the dynamic locale object builder can build locale objects dynamically at run-time. The disclosure and claims herein thus expressly extend to a dynamic locale object builder in any type of software, whether currently known or developed in the future. In addition, instead of using a master character map 123 to generate needed character maps at run-time, prior art character maps, such as those shown in FIG. 5, could also be used.

The claims and disclosure herein provide a way to log historical data that indicates which locale objects were used during a first execution of software. During a second execution of the software, the historical data is read, and locale objects or subsections of locale objects are dynamically built from locale source files based on the historical data in the log that indicates which locale objects were used during the first execution. Any other locale objects or subsections that are needed that are not built initially during the second execution are dynamically built from locale source files when requested at run-time. Dynamically building locale objects or subsections based on which locale objects were used in one or more previous executions saves time that would otherwise be required to build the locale objects when they are needed at run-time. The result is significant savings in system-wide resources while still allowing for access to a large number of possible locales.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for building at least one requested subsection of at least one locale object at run-time, the method comprising the steps of:
    during a first execution of operating system software, logging historical data relating to which locale objects were used during the first execution of the operating system software in a locale object historical usage log;
    during initialization of the operating system software during a second execution of the operating system software subsequent to the first execution, performing the steps of:
        reading the locale object historical usage log;
        selecting a locale object identified in the locale object historical usage log;
        identifying a locale source file corresponding to the selected locale object;
        generating a character map from a master Unicode character map that is a superset of a plurality of character maps; and
        building from the generated character map and from the identified locale source file at least one subsection of the selected locale object.

2. The method of claim 1 further comprising the steps of:
    receiving a request for at least one subsection of a requested locale object from a software application at run-time;
    identifying at least one of the plurality of locale source files corresponding to the requested locale object;
    dynamically building the at least one subsection of the requested locale object from the identified at least one locale source file;
    loading the requested at least one subsection of the requested locale object into the memory; and
    returning to the software application a reference to the at least one subsection of the requested locale object.

3. The method of claim 2 wherein each of the plurality of locale source files includes a plurality of subsections and the requested locale object includes the plurality of subsections that includes the at least one subsection.

4. The method of claim 3 further comprising the step of the software application referencing the requested subsection in the requested locale object as needed.

5. The method of claim 3 wherein the plurality of subsections includes:
    a first subsection that includes information relating to character classification and case conversion;
    a second subsection that includes information relating to collation order;
    a third subsection that includes information relating to monetary formatting;
    a fourth subsection that includes information relating to numeric, non-monetary formatting;
    a fifth subsection that includes information relating to date and time formats; and
    a sixth subsection that includes information relating to formats of informative and diagnostic messages and interactive responses.

6. The method of claim 1 wherein the step of loading the requested subsection of the requested locale object into the memory comprises the step of loading the requested subsection of the requested locale object into global memory that may be read by a plurality of software applications.

7. The method of claim 1 further comprising the step of rebooting the at least one processor between the first execution and the second execution of the operating system software.

8. A computer-implemented method executed by at least one processor for building a subsection of a requested locale object at run-time, the method comprising the steps of:
    during a first execution of operating system software, building a locale object historical usage log that includes historical data relating to which locale objects were used in the first execution of the operating system software;
    during initialization of the operating system software during a second execution of the operating system software, performing the steps of:
        selecting a locale object in the historical usage log;
        identifying at least one of the plurality of locale source files corresponding to the selected locale object, each of the plurality of locale source files including:
            a first subsection that includes information relating to character classification and case conversion;
            a second subsection that includes information relating to collation order;
            a third subsection that includes information relating to monetary formatting;
            a fourth subsection that includes information relating to numeric, non-monetary formatting;
            a fifth subsection that includes information relating to date and time formats; and
            a sixth subsection that includes information relating to formats of informative and diagnostic messages and interactive responses;
        generating an identified character map from a master character map; and
        building at least one requested subsection of the selected locale object from the identified character map and from the identified at least one locale source file.

* * * * *